(12) United States Patent
Maeda et al.

(10) Patent No.: US 6,353,394 B1
(45) Date of Patent: Mar. 5, 2002

(54) SEAT OCCUPANCY SENSOR

(75) Inventors: Junji Maeda; Katsuhiro Mori, both of Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/664,316

(22) Filed: Sep. 18, 2000

(30) Foreign Application Priority Data

Sep. 17, 1999 (JP) ............................................. 11-264350

(51) Int. Cl.[7] ............................................... G08B 21/00
(52) U.S. Cl. ........................ 340/667; 340/666; 340/438; 177/144; 280/735
(58) Field of Search ................................. 340/436, 438, 340/666, 667, 668; 177/144, 199, 210 R, DIG. 6; 280/730.2, 735

(56) References Cited

U.S. PATENT DOCUMENTS

| | | | | |
|---|---|---|---|---|
| 4,560,016 A | * | 12/1985 | Ibanez et al. ........... 177/210 R |
| 4,781,056 A | * | 11/1988 | Noel et al. ..................... 73/800 |
| 5,262,843 A | * | 11/1993 | Sugarbaker et al. ........ 356/350 |
| 5,698,828 A | * | 12/1997 | Perkins .................... 200/61.54 |
| 5,865,463 A | * | 2/1999 | Gagnon et al. ............. 280/735 |
| 5,896,090 A | | 4/1999 | Okada et al. ............... 340/667 |
| 6,040,532 A | * | 3/2000 | Munch ........................ 340/667 |

* cited by examiner

Primary Examiner—Van T Trieu
(74) Attorney, Agent, or Firm—Burns, Doane, Swecker & Mathis, LLP

(57) ABSTRACT

An on-seat occupant detector apparatus includes a seat occupancy sensor made up of an optical wave guide provided in the seat for allowing the passage of light. The optical wave guide has a light transmissive portion possessing a curvature that is variable, with the optical wave guide changing the physical quantity of the light passing through the light transmissive portion when the curvature varies as a result of occupancy of the seat. The sensor also includes a light emitting device for inputting light into the optical wave guide, a light receiving device for receiving light outputted from the optical wave guide, and a detecting device which detects occupancy of the seat when the physical quantity of light passing through the light transmissive portion changes due to a change in the curvature of the transmissive portion as a result of the occupancy of the seat.

18 Claims, 17 Drawing Sheets

(E) INTENSITY OF LIGHT RECEIVED
BY PHOTO-TRANSISTOR (F) OUTPUT VOLTAGE Vo OF
PHOTO-TRANSISTOR

SEAT OCCUPANCY SENSOR

This application is based on and claims priority under 35 U.S.C. § 119 with respect to Japanese Patent Application No. 11(1999)-264350 filed on Sep. 17, 1999, the entire content of which is incorporated herein by reference.

FIELD OF THE INVENTION

The present invention is generally related to a sensor. More particularly, the present invention pertains to a seat occupancy sensor for a vehicle seat that is usable in conjunction with various vehicle onboard systems such as an airbag actuation device and/or a seat belt warning device.

BACKGROUND OF THE INVENTION

An example of a known type of seat occupancy sensor is disclosed in U.S. Pat. No. 5,896,090. This known device for detecting a seated person on a seat includes a pressure switch disposed in the seat. The pressure switch includes a pair of films and a pair of electrodes disposed between the films. The pair of electrodes are spaced in the film so as to define an OFF condition of the pressure switch. The pressure switch is in an ON condition when the electrodes contact each other. The device further includes a controller connected to the electrodes of the pressure switch to determine whether or not the seat is occupied by the person in accordance with the ON and OFF condition of the pressure switch.

With the construction of the seat occupant sensor described above, the ON condition of the pressure switch is established by deformation of the films when the seat is occupied by the person. However, if the ambient temperature is very low, the films become relatively inflexible. Under such conditions, the ON condition of the pressure switch may not be established when the seat is occupied by a person.

Thus, a need exists for a seat sensor device that is accurate and reliable under different operating conditions, including when the ambient temperature is relatively low.

SUMMARY OF THE INVENTION

According to one aspect of the present invention, a seat occupancy sensor includes an optical wave guide provided in the seat for allowing the passage of light. The optical wave guide has a light transmissive portion possessing a curvature that is variable, with the optical wave guide changing the physical quantity of the light passing through the light transmissive portion when the curvature varies as a result of occupancy of the seat. The sensor also includes a light emitting device for inputting light into the optical wave guide, a light receiving device for receiving light outputted from the optical wave guide, and a detecting device which detects occupancy of the seat when the physical quantity of light passing through the light transmissive portion changes due to a change in the curvature of the transmissive portion as a result of the occupancy of the seat.

The occupancy of the seat, by a person or an object other than a person such as baggage, applies a load on the optical wave guide to cause the change in the curvature of the light transmissive portion of the optical wave guide. Thus, the physical quantity of the light passing through the optical wave guide also changes. Typically, the physical quantity is the amount of light. In the case where the light is a laser beam, its phase of wavelength can be used as the physical quantity.

As the physical quantity of the transmissive light changes, the light received at the light receiving means changes accordingly. On the basis of this, the detecting device determines whether or not the seat is occupied. The seat can be a vehicle seat as well as other types of seats such as a chair, a toilet seat, etc. In the case of vehicle seats, the present invention has application to the driver's seat, the front passenger seat and the rear seat.

In accordance with the present invention, an optical fiber can be used as the optical wave guide. The optical fiber can be formed of plastic or quartz, with the plastic optical fiber being highly useful from the standpoint of being well suited to avoiding potential damage.

Depending upon the circumstances, the optical wave guide can also be formed by providing a thin film having optical guide properties onto a substrate so as to be in a layer structure. To permit a change in the curvature upon occupancy of the seat, the substrate is preferably flexible.

The light emitting means can be in the form of a light emission element which converts electric signals to light such as a light emission diode (LED) or a laser element which emits a coherent, high-directive laser beams is possible. Devices emitting either visible or invisible light can be employed, and either laser beam or non-laser beam is acceptable. In the case of visible light, color is not limited and therefore red light, blue light, green light, yellow light, deep blue light and so on, can be employed.

The light receiving means can be in the form of a light receiving element which converts received light into electric signal such as a photo-transistor, photo-diode or the like.

The transmissive portion of the optical wave guide possesses a bent portion that is adapted to have its curvature changed to thereby change the physical quantity of the light passing through the optical wave guide when upon occupancy of the seat. The bent portion can take anyone of a variety of different forms including a loop, a U-shaped structure, an inverted U-shaped structure, a V-shaped structure, and an inverted V-shaped structure. It is also possible to form the transmissive portion as a plurality of bent portions. For example, the bent portion can be formed as a coil-like structure having plural loops, or can be formed as a repeating alternating series of the other mentioned structures.

The detecting device can be structured to detect occupancy of the seat depending on the difference between the emitted light signal of the light emitting means and the light receiving signal received by the light receiving means. The detecting device can also have the distinct function of distinguishing whether the seat is occupied by a person or a non-person object such as baggage. In general, the weight of a person, especially an adult, is greater than that of an object such as baggage. Using this empirical knowledge, it is possible to distinguish between a person and baggage occupying the seat based on the curvature change of the bent portion which varies with the applied load.

The detecting device can also be designed to perform a distinguishing function based on a difference between the emitted light signal of the light emitting means and the light receiving signal received by the light receiving means. As the difference, either the amount of time delay of the received light relative to the emitted light or the magnitude of the changing rate of such a time delay can be utilized. If an object other than a human body is seated on the seat, the frequency of the behavior or movement of the object is quite small or non-existent. In contrast, when a person (i.e., a human body) sits on the seat, the frequency of the individual's movements is very high. It is thus possible to relatively easily recognize whether a person is seated on the seat or whether instead some other object is seated on the seat by measuring the frequency of change of the physical quantity of light passing through the transmissive portion of the optical wave guide. For example, be monitoring or measuring the magnitude of the changing rate of the time delay, it is possible to readily easily determine whether a person or baggage is on the seat.

A voltage signal having a rising leading edge and a falling trailing edge can be inputted to the light emitting means in pulses. Because the initial stage of light emission at the light emitting means involves a relatively small amount of emitted light, this can be used to make clear the difference between the emitted signal and the received signal such as the time difference or voltage difference. The rising leading edge can be obtained by employing a wave shape voltage such as serration-shaped wave. Also, waves such as a triangle wave, sine wave, trapezoid wave and the like can be employed. If necessary, a rectangular wave and others can also be used.

According to another aspect of the present invention, an occupancy detectable seat includes a seat portion with respect to which a person is to be seated, a light emitter adapted to emit light, an optical wave guide provided in the seat portion and including an input portion connected to the light emitter to receive light emitted by the light emitter and an output portion which is connected to a light receiver that receives light outputted from the optical wave guide. The optical wave guide is adapted to change a physical quantity of light passing through the optical wave guide upon application of a load to the optical wave guide associated with occupancy of the seat portion. In addition, a detecting device detects occupancy of the seat portion based on the change in the physical quantity of light passing through the optical wave guide due to application of the load to the optical wave guide associated with occupancy of the seat portion.

According to a further aspect of the invention, a seat occupancy sensor for determining occupancy of a seat includes a light emitter, an optical wave guide, a light receiver and a detecting device. The light emitter is connected to an input portion of the optical wave guide for emitting light and the light receiver is connected to an output portion of the optical wave guide for receiving light outputted from the optical wave guide. The optical wave guide is adapted to be positioned in the seat and to change a physical quantity of light passing through the optical wave guide upon application of a load to the optical wave guide associated with occupancy of the seat. The detecting device detects occupancy of the seat based on the change in the physical quantity of light passing through the optical wave guide due to application of the load to the optical wave guide associated with occupancy of the seat.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
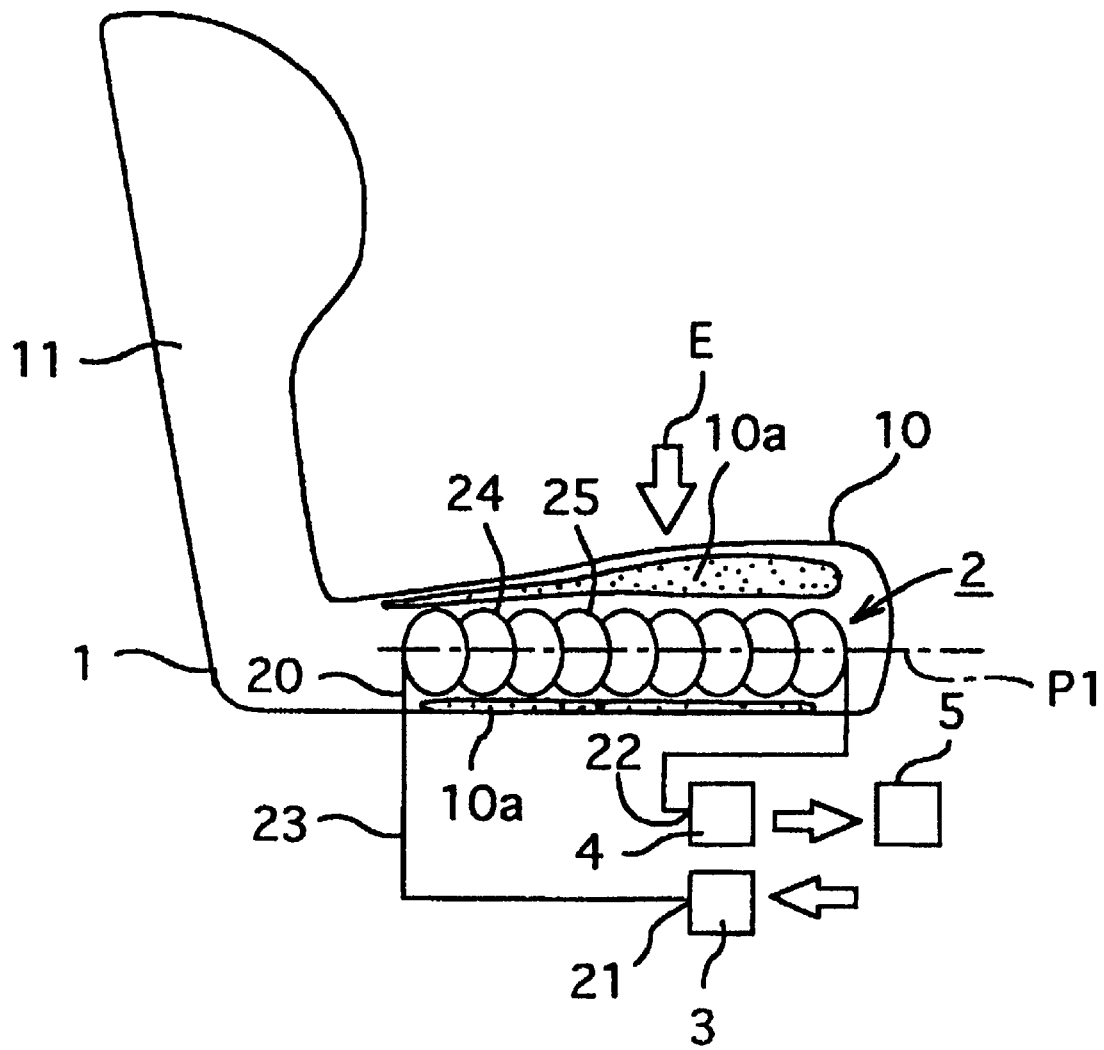
FIG. 1 is a side view of a vehicle seat including the seat occupant sensor in accordance with an embodiment of the present invention.

Referring initially to FIGS. 1–4, a seat 1 on which an individual is to be seated is mounted in a vehicle, particularly an automotive vehicle. The seat 1 includes a seat cushion 10 for supporting the individual's buttocks and a seat back 11 for supporting the individual's back. Both the seat cushion 10 and the seat back 11 constitute a seat portion with respect to which a person is to be seated.

The seat 1 is provided with a personnel occupancy detector 2. The occupancy detector 2 includes an optical fiber 20 which constitutes an optical wave guide built into the seat cushion 10, a light emitter 3 connected to the optical fiber 20 for emitting a light into the optical fiber 20, a light receiver 4 connected to the optical fiber for receiving light from the optical fiber 20, and a detecting device 5 which determines whether or not the seat 1 is occupied on the basis of a change in the physical quantity (in this embodiment, the amount of light) of light passing through the optical fiber 20. The optical fiber 20 is preferably comprised of a core and a cladding covering the core, with the core and the cladding having different refraction indices.

The optical fiber 20 is accommodated in the cushion 10 of the seat 1 together with an elastic cushion member 10a so that the optical fiber is protected by the cushion member 10a. The optical fiber 10 has an input end 21 to which the light is inputted, an output end 22 from which the light is outputted, and a transmissive portion 23 positioned between the input end 21 and the output end 22.

The transmissive portion 23 of the optical fiber 20 is in the form of a coil comprised of a group 25 of generally ring-shaped or annular loops 24. Each loop 24 acts as a bent portion. The group 25 of loops located within the cushion 10 of the seat 1 is adapted to be deformed under the weight of the occupant seated on the seat 1. Under such a condition, the curvature or curvature radius of one or more of the loops 24 becomes smaller.

The group 25 of loops 24 is arranged to the axis P1 of the group 25 extends in the longitudinal direction of the cushion 10 of the seat 1. The group 25 of loops 24 is thus adapted to receive a load from the seat occupant in a direction E perpendicular to the direction of extent of the group 25 of loops 24, thus establishing a relatively easy deformation of the loops 24. Of course, the loop group 25 can also be arranged in the lateral direction of the seat cushion 10. It is to be noted that the longitudinal and lateral directions of the seat 1 and the seat cushion 10 correspond to the longitudinal and lateral directions, respectively of the vehicle body.

Figure 2:
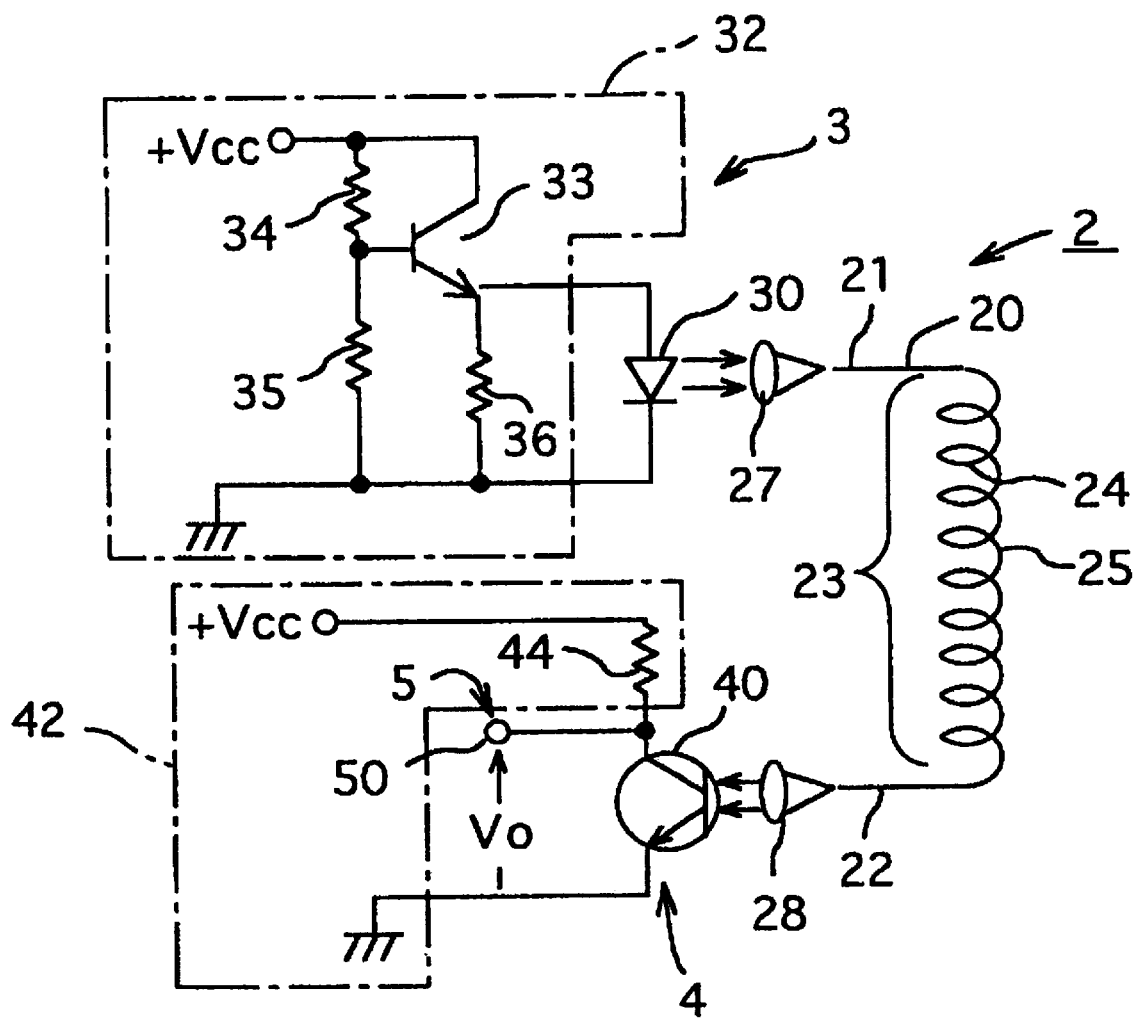
FIG. 2 is an electrical circuit diagram of the seat occupant sensor illustrated in FIG. 1.

As shown in FIG. 2, the light emitter 3 includes a light emitting diode (LED) 30 constituting a light emitting element, and a power supply circuit 32 for supplying electricity to the light emitting diode 30. The power supply circuit 32 includes a transistor 33, dividing resistors 34, 35, and an emitter resister 36. A power source voltage +Vcc is divided by the dividing resistors 34, 35 and the resultant voltage or divided voltage is applied as a base input voltage $V_{BASE}$ to a gate of the transistor 33. This voltage application turns the transistor 33 ON, which causes a continual current flow between the collector and the emitter in the transistor 33 and causes the LED 30 to assume a continual illumination condition involving the emission of light. The resulting light beam emitted from the LED 30 is inputted to the input side 21 of the optical fiber 20 by way of a light collecting lens 27 located between the LED 30 and the input side 21 of the optical fiber 20. The light beam may be red in color, but is not limited in this regard.

As can be further seen from FIG. 2, the light receiver 4 includes a photo-transistor 40 and a power supply circuit 42 connected to the photo-transistor 40 for supplying electricity to the photo-transistor 40. The photo-transistor 40 receives the light beam emitted from the output side 22 of the optical fiber 20 by way of a light receiving lens 28 located between the output side 22 of the optical fiber 20 and the light receiving side of the light receiving lens 28. The power supply circuit 42 has a resistor interposed between a collector of the photo-transistor 40 and the source voltage +Vcc.

The detecting device 5 includes an output terminal 50 positioned between the resistor 44 and the collector of the photo-transistor 40. As will be described below in more detail, by virtue of the fact that a human body seated on the seat 1 varies the output voltage Vo of the output terminal 50, it is possible to determine whether or not the seat 1 is occupied based on the output voltage Vo.

Figure 3:
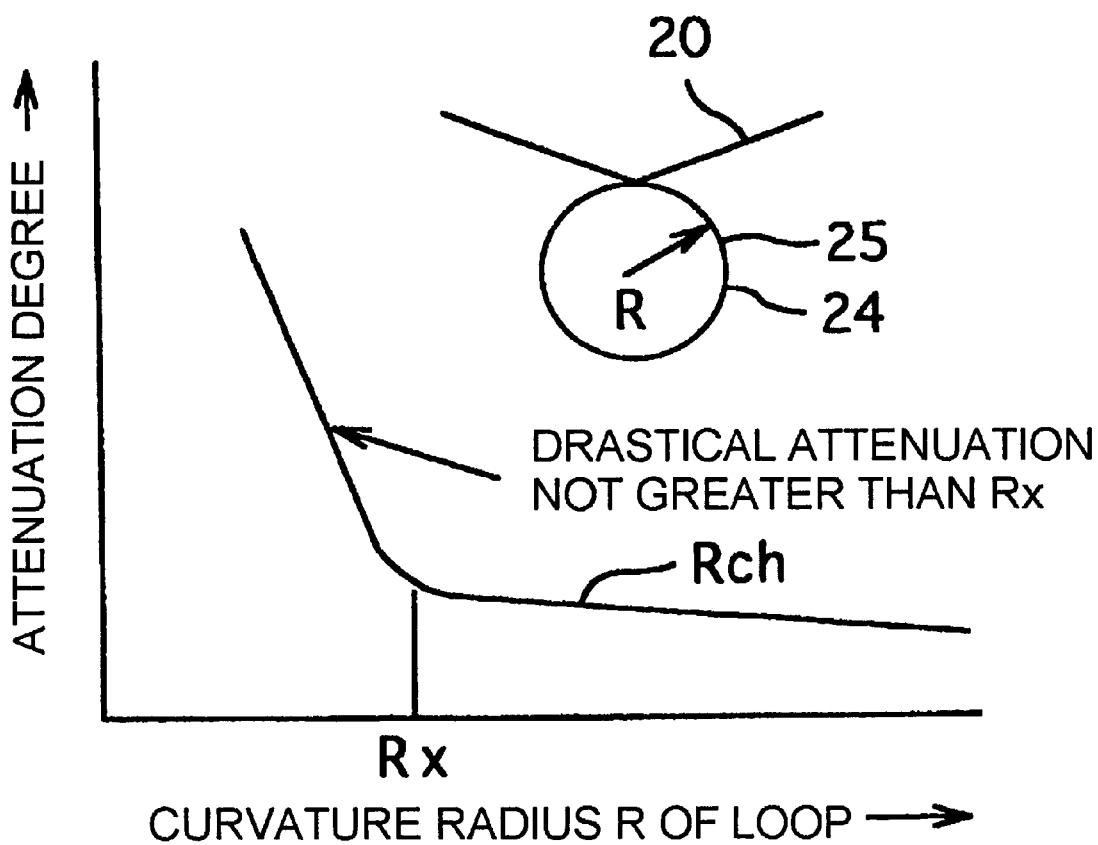
FIG. 3 is a graph illustrating the attenuation rate or degree of light passing through the optical fiber used in the seat occupant sensor and the curvature radius of the optical fiber.

The graph illustrated in FIG. 3 depicts the attenuation rate of light passing through the optical fiber 20 (vertical axis) versus the curvature radius R of the loop 24 of the optical fiber 20 (horizontal axis). As the attenuation rate of the light increases (i.e., moving along the vertical axis in the upward direction), the amount of light passing through the optical fiber 20 decreases.

Light passes through the optical fiber 20 by utilizing the total light reflection property. However, as the transmissive portion 23 of the optical fiber is bent into a smaller radius, the total reflection property becomes less, which causes an attenuation phenomena in which light leaks outside from the outer wall of the optical fiber 20. As the amount of leakage of the light becomes larger, the amount of the light outputted from the output side 22 of the optical fiber 20 becomes much smaller. As the characteristic line Rch in FIG. 3 indicates, if the curvature radius of the loop 24 is in excess of a threshold curvature radius Rx, the attenuation of the amount of light in the optical fiber 20 is small. As a result, it is expected that the light inputted into the input end 21 of the optical fiber 20 is, after being transmitted or passed through the transmissive portion 22 of the optical fiber 20, outputted from the output end 22 of the optical fiber 20 with less leakage of light.

In contrast, when the characteristic line Rch becomes less than the threshold curvature radius Rx of the loop 24, the attenuation of the amount of light passing through the transmissive portion 23 increases and becomes considerably larger. Thus, relative to the amount of light inputted to the input end 21 of the optical fiber 20, the amount of light outputted from the output end 22 of the optical fiber 20 becomes very much smaller.

Thus, when an individual sits on the seat cushion 10 of the seat 1, the loop portion(s) 24 having a substantially circular or annular structure becomes flattened so that the loop(s) 24 possesses a portion which is of a smaller curvature radius, thus decreasing the amount of light outputted from the output end 22 of the optical fiber 20.

In other words, when an individual is not seated on the seat cushion 10 of the seat 1, the curvature radius of the loop 24 of the transmissive portion 23 of the optical fiber 20 is larger than the threshold curvature radius Rx. As a result, the attenuation of the amount of light passing through the transmissive portion 23 of the optical fiber 20 is relatively small or almost zero. Thus, the light emitted from the light emitter 3 and inputted to the input end 21 of the optical fiber 20 passes through the transmissive portion 23 of the optical fiber 20 and is outputted from the output portion 22 of the optical fiber 20 to be beamed to the photo-transistor 40. That is, the amount of light which the photo-transistor 40 receives is relatively large. Thus, when an individual is not seated on the seat cushion 10 of the seat 1, the photo-transistor 40 assumes the ON condition and establishes a conductive condition between the collector and the emitter of the photo-transistor 40. The resulting flow of collector current makes the output voltage at the output terminal 50 LOW (about zero volts). The system thus determines that a person is not seated on the seat cushion 10 of the seat 1.

On the other hand, when an individual weighing more than a predetermined weight or value sits on the seat cushion 10 of the seat 1, bending stress is applied to the loop group 25 of the transmissive portion 23 of the optical fiber 20, thus causing the loop group 25 to be flattened. A portion(s) of the loop group 25 having a curvature radius less than the threshold curvature radius Rx is thus formed in the loop group 25 and the attenuation of light in the transmissive portion 23 of the optical fiber 20 increases. This decreases the amount of light passing through the transmissive portion 23 of the optical fiber 20, resulting in the amount of light outputted from the output end 22 of the optical fiber 20 becomes smaller. The amount of light received at the photo-transistor 40 is less than the limit sensitivity, thereby turning the photo-transistor 40 to OFF. The output voltage Vo of the output terminal 50 is thus indicated to be HIGH (+Vcc), thereby providing an indication that an individual is sitting on the seat cushion 10 of the seat 1.

Figure 4:
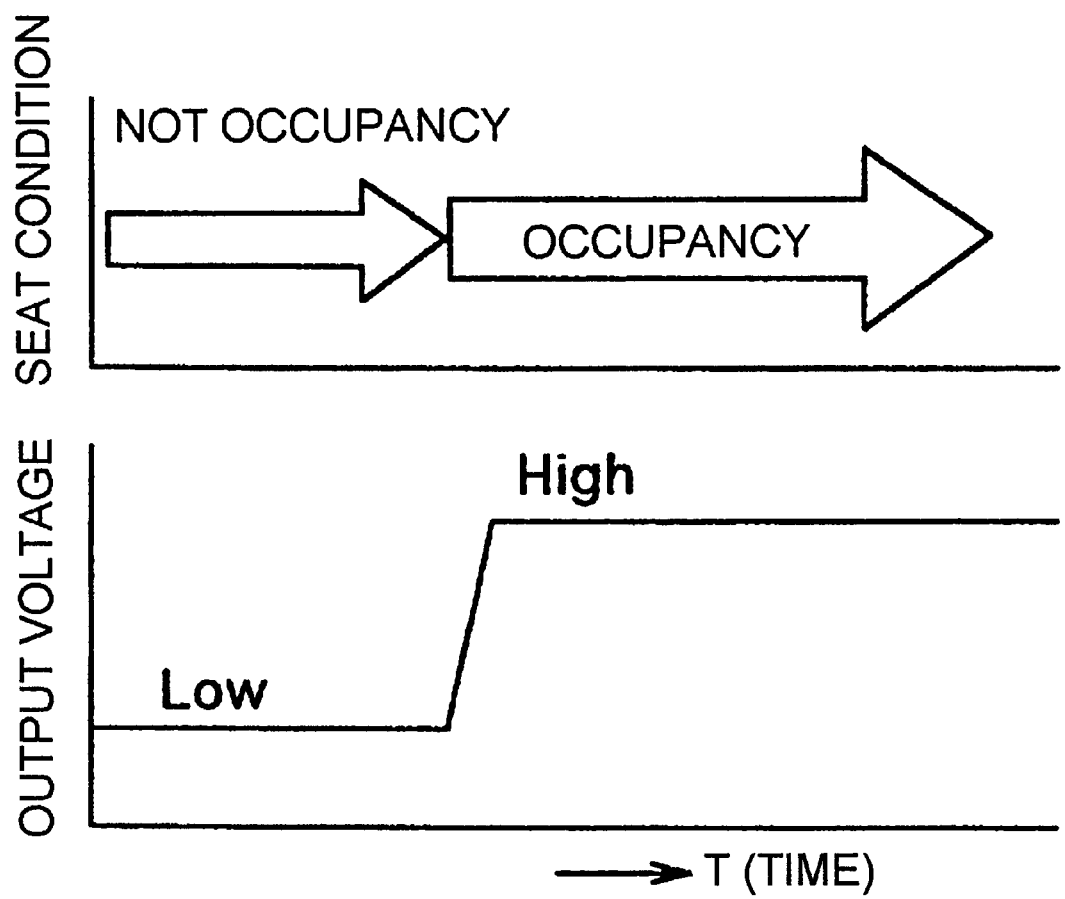
FIG. 4 is a graph illustrating how the detecting device of the present invention detects a human body on a seat.

Referring to FIG. 4, when a person is not seated on the seat cushion 10 of the seat 1, the output voltage Vo of the output terminal 50 indicates LOW (about 0 volts). On the other hand, when a person is seated on the seat cushion 10 of the seat 1, the output voltage Vo of the output terminal 50 indicates HIGH (about +Vcc).

As described above, in the first embodiment of the present invention, an individual seated on the seat cushion 10 of the seat 1 causes one or more loops 24 of the optical fiber 20 to be flattened which changes the curvature radius of the loop 24 and thus changes the amount of transmitted light. On the basis of such a change, the system is able to determine whether or not a person is seated on the seat cushion 10 of the seat 1.

A second embodiment of the personnel occupancy detector 2 of the present invention is illustrated in FIGS. 5–8. This second embodiment is similar in concept to the first embodiment, but differs in the manner described below. The personnel occupancy detector 2 of the second embodiment includes a plastic-made optical fiber 20 having a relatively small radius of curvature and constituting an optical wave guide built into the seat cushion 10. The detector 2 also includes a light emitter or a light emitting diode (LED) 30 from which light is emitted to the optical fiber 20, a light receiver or a photo-transistor 40 for receiving the light from the optical fiber 20, and a control processing circuit 55 serving as a detecting device 5 which determines whether or not the seat 1 is occupied based on a change of the physical quantity (in this embodiment, the amount of light) of the light passing through the optical fiber 20.

The control processing circuit 55 includes a microcomputer and a pulse generating function. The control processing circuit 55 has a power supply port 55s to which is applied a power supply voltage (+Vcc). A resistor 62 is interposed between the power supply voltage (+Vcc) and the photo-transistor 40.

The optical fiber 20 includes an input end 21 to which the light emitted from the LED 30 is inputted, an output end 22 from which the light is outputted, and a transmissive portion 23 through which the light moves from the input end 21 to the output end 22. The transmissive portion 23 of the optical fiber 20 is configured in the shape of a group 25 of loops 24. The loop group 25 is embedded in the seat cushion 10 and is adapted to be deformed under the weight of an individual seated on the seat cushion 10 in a manner similar to that described above in connection with the first embodiment.

The control processing circuit 55 has an output port 55o which is connected to the LED 30. As will be explained in more detail below, the LED 30 is applied in a pulsing manner with an input voltage having a serrated-type wave shape so as to illuminate the LED 30 in a pulsed fashion. The flashing cycle depends on the pulse of the input voltage.

Figure 5:
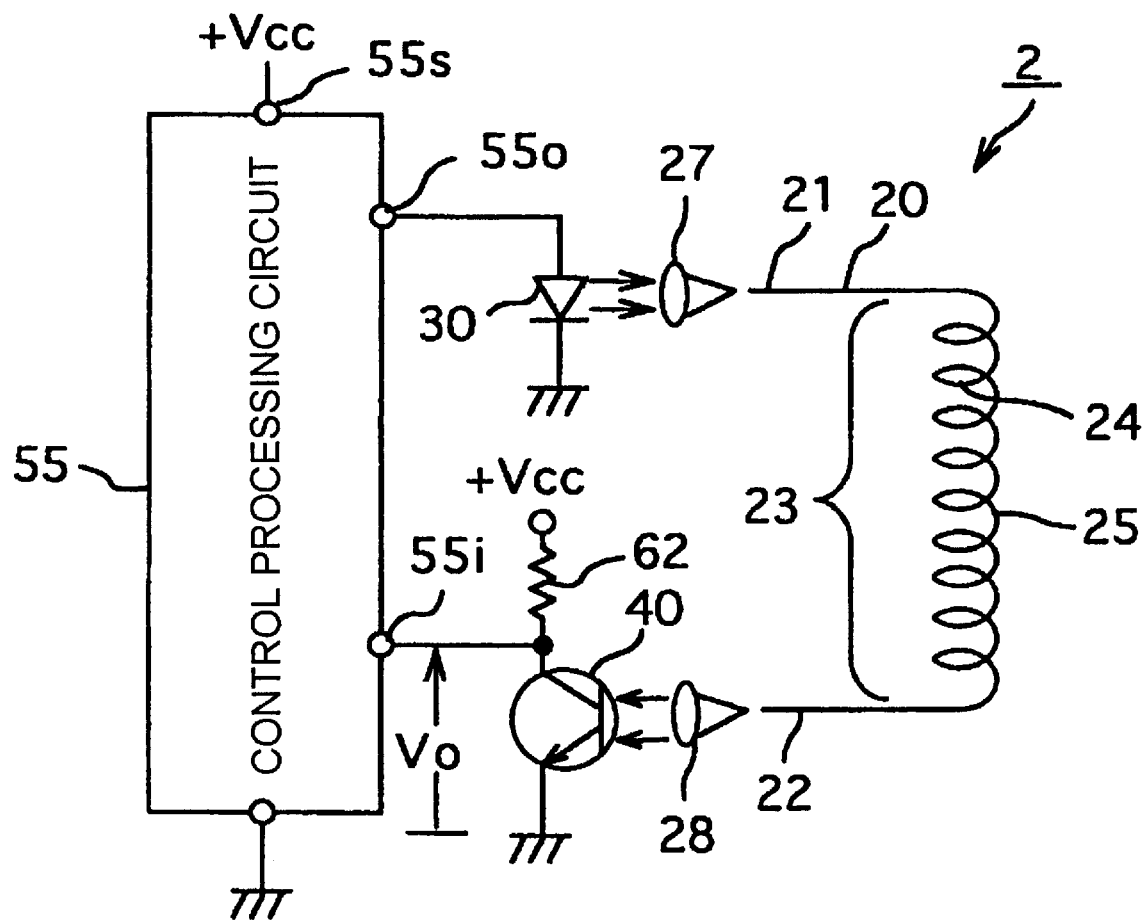
FIG. 5 is a another electrical circuit diagram of the seat occupancy sensor illustrated in FIG. 1 which differs from the electrical circuit diagram shown in FIG. 2.

As further shown in FIG. 5, the control processing circuit 55 has an input port 55i which is electrically connected to a collector of the photo-transistor 40 for being applied with an output voltage Vo. Thus, the time delay of the output voltage Vo (i.e., the light receiving signal) relative to the light emitting signal is determined or measured by the control processing circuit 55. In other words, when an individual is not seated on the seat cushion 10 of the seat 1, the curvature radius of the loops 24 of the transmissive portion 23 of the optical fiber 20 is greater than the threshold curvature radius Rx. This causes a small, and almost zero, attenuation of the light in the transmissive portion 23 of the optical fiber 20 so that a relatively large amount of light is received by the photo-transistor 40. Thus, the photo-transistor 40 becomes ON, which establishes a conductive condition between the collector and the emitter of the photo-transistor 40. This results in the flow of collector current, thereby making the output voltage at the output terminal 50 LOW (about zero volts). The system thus determines that an individual is not seated on the seat cushion 10 of the seat 1.

On the other hand, when a person weighing more than the aforementioned predetermined weight or value sits on the seat cushion 10 of the seat 1, the loop group 25 of the optical fiber 20 becomes flattened so that one or more portions of the loop group 25 possess a reduced or smaller curvature radius. This increases the attenuation of light in the transmissive portion 23 of the optical fiber 20 and so the amount of light passing through the transmissive portion 23 of the optical fiber 20 becomes smaller or is reduced. The amount of light received at the photo-transistor 40 is also reduced, resulting in the photo-transistor 40 being turned off. Thus, no collector current flows and so the output voltage Vo at the output terminal 50 is indicated to be HIGH (+Vcc), thereby providing an indication that a person is sitting on the seat cushion 10 of the seat 1.

Figure 6A:
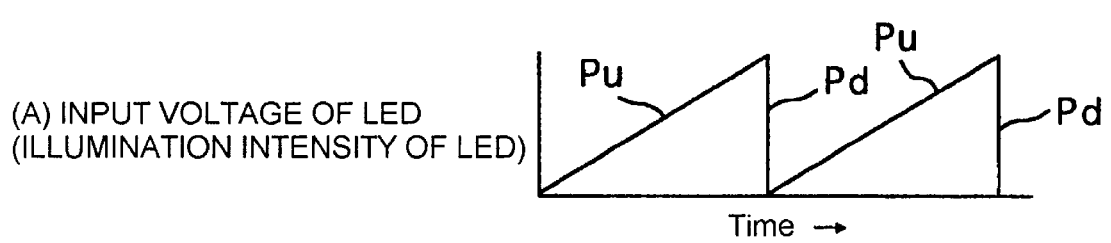
FIGS. 6A–6F are graphs illustrating the input voltage of to the LED, the illumination intensity or light strength that the photo-transistor receives, and the output voltage outputted by the photo-transistor.
Figure 6B:
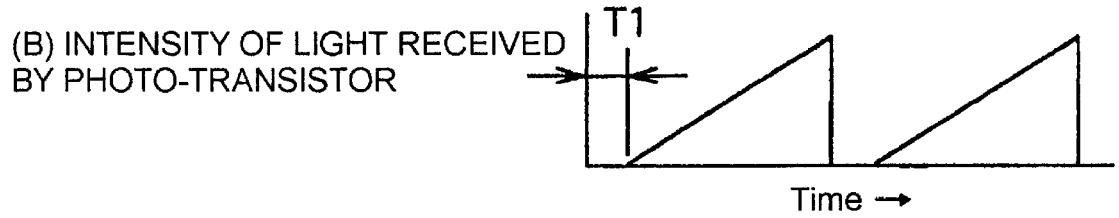
Figure 6C:
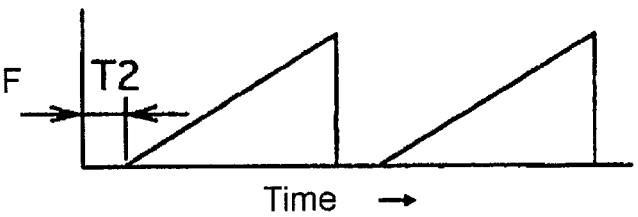

When it is determined that a person is not seated on the seat cushion 10 of the seat 1, the input voltage (i.e., the light emitting signal) applied to the LED 30 is in the form of a serration-shaped pulse signal (i.e., an inclined rise in the input voltage followed by an immediate drop in the input voltage) as shown in a graph in FIG. 6(A). In this graph, the horizontal axis indicates time and the vertical axis indicates the voltage applied to the LED 30 (i.e., the illumination intensity of the LED 30). In the graph of FIG. 6(B), the vertical axis indicates time and the horizontal axis indicates the intensity of light received at the photo-transistor 40. FIG. 6(C) is a graph in which the horizontal axis indicates time and the vertical axis indicates the output voltage outputted by the photo-transistor 40 or the light receiving signal.

In the present embodiment, upon detection of a person seated on the seat cushion 10 of the seat 1, the LED 30 is applied, in a repetitive manner, with the input voltage having the aforementioned serration-type shape pulse. Such a pulse has a leading or rising edge Pu whose voltage increases with the passage of time and a trailing or falling edge Pd whose voltage drops or decreases from the peak to zero in a rapid or abrupt manner as illustrated. Thus, at an earlier half stage of a single pulse of the input voltage to the LED 30, the amount of light illuminated at the LED 30 is relatively small, while at a later half stage of the single pulse, the illumination amount of the LED 30 increases gradually from the relatively small amount and is greater than at the earlier half stage.

As can be seen from FIG. 6(B), the intensity of light which the photo-transistor 40 receives begins to increase at a time delay of T1 relative to the input voltage (i.e., light emitting signal) to the LED 30. Thus, as shown in FIG. 6(C), the output voltage Vo of the photo-transistor 40 which is to be applied to the input port 55i of the control processing circuit 55 begins to rise or increase at a time delay of T2 relative to the rising or increase of the input voltage (i.e., light emitting signal) of the LED 30. The delay time T2 represents a time difference between the light emitting signal and the light receiving signal.

As mentioned above, the output voltage Vo (i.e., light receiving signal) of the photo-transistor 40 begins to rise at a time delay of T2 relative to the rising of the input voltage (light emitting signal) of the LED 30. This is due to the fact that while the input voltage inputted to the LED 30 is small, the illumination amount at the LED 30 is small and such small illumination reaches the minimum light receiving sensitivity of the photo-transistor 40 at which the photo-transistor 40 begins to operate.

Figure 6D:
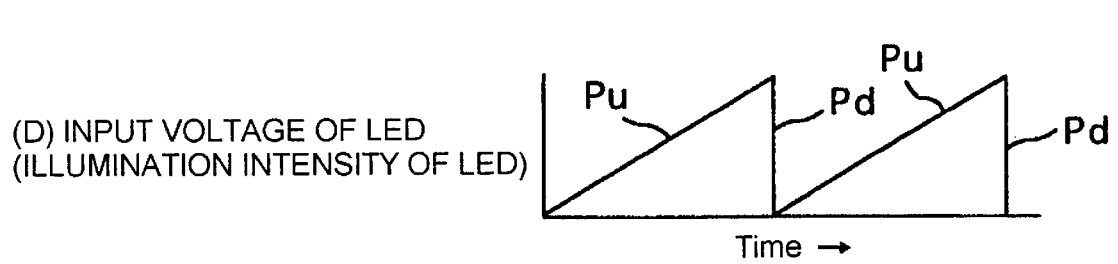
Figure 6E:
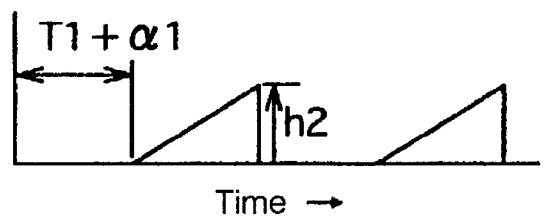
Figure 6F:
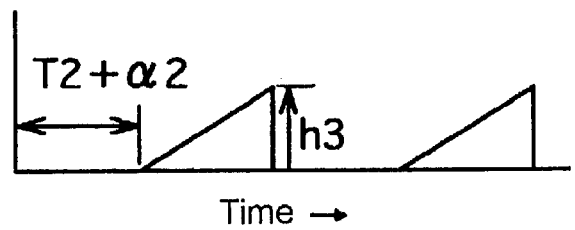

When it is determined that a person is sitting on the seat cushion 10 of the seat 1, the input voltage (i.e., light emitting signal) applied to the LED 30 is in the form of a serration-shaped pulse signal as shown in a graph in FIG. 6(D). In this graph, the horizontal axis indicates time and the vertical axis indicates the voltage applied to the LED 30 (i.e., the illumination intensity of the LED 30). In the graph of FIG. 6(E) the vertical axis indicates time while the horizontal axis indicates the intensity of light received at the photo-transistor 40. In the graph of FIG. 6(F), the horizontal axis represents time and the vertical axis indicates the output voltage of the photo-transistor 40 or light receiving signal.

As shown in FIG. 6(D), and in a manner similar to that shown in FIG. 6(A), the LED 30 is applied with the input voltage in a serration-type shape pulse in a repetitive fashion. The intensity of the emitted light which is received at the photo-transistor 40, as shown in FIG. 6(E), begins to rise at a time delay of (T1+α1). Thus, as shown in FIG. 6(F), the output voltage Vo of the photo-transistor 40 (i.e., light receiving signal) begins to rise at a time delay of (T2+α2). This is the time difference between the light emitting signal and the light receiving signal. The time duration (T1+α1) is larger than the time duration T1. Also, the time duration (T2+α2) is larger than the time duration T2.

As described above, when a person is seated on the seat cushion 10 of the seat 1, the output voltage Vo of the photo-transistor 40 (i.e., light receiving signal), as shown in FIG. 6(F), begins rising or increasing at a time delay of (T2+α2) relative to the input voltage of the LED 30 (i.e., the light emitting signal). The reason is as follows. The load associated with a person sitting on the seat cushion 10 is applied to one or more of the loops 24 of the optical fiber 20 and the resulting bending stress reduces the curvature radius at one or more portions of the loop(s). Thus, the amount of light passing through the optical fiber 20 becomes smaller, and is unable to effect operation of the photo-transistor 40. When a person sits on the seat cushion of the seat 1, the light intensity of the photo-transistor 40 become h2 and the output voltage of the photo-transistor 40 become h3. These values are smaller than those that exist when no person is seated on the seat cushion 10 of the seat 1.

In other words, when an individual is not seated on the seat cushion 10 of the seat 1, the curvature radius of the loop 24 of the transmissive portion 23 of the optical fiber 20 is larger than the threshold curvature radius Rx, and so the attenuation of light in the optical fiber 20 is rather small or zero. Thus, most or all of the light inputted to the input end 21 of the optical fiber 20 which is emitted from the LED 30 is, after passing through each loop 24 of the transmissive portion 23, outputted from the output end 22 of the optical fiber 20. The resulting light is projected to the photo-transistor 40. Thus, the amount of light projected at the photo-transistor 40 is relatively large when no person is sitting on the seat 1 and this results in the delayed time duration T1 and the delayed time duration T2 being relatively small.

However, when a person weighing more than the predetermined value or weight is seated on the seat cushion 10 of the seat 1, bending stress is applied to at least a portion of one or more of the loops 24 of the transmissive portion 23 of the optical fiber 20. The curvature radius of these portions thus changes and becomes smaller than the threshold curvature radius Rx. The result is that the attenuation of light in the transmissive portion 23 of the optical fiber 20 is increased, thereby decreasing the amount of light passing through the optical fiber 20. Thus, the amount of light outputted from the output end 22 of the optical fiber 20 becomes smaller so that the amount of light to be projected to the photo-transistor 40 is also decreased. Thus, when a person is seated on the seat 1, the delay time duration (T1+α1) and the delay time duration (T2+α2) become larger. If these values are larger than the respective threshold values, it is determined that the seat 1 is occupied by a person.

Figure 7:
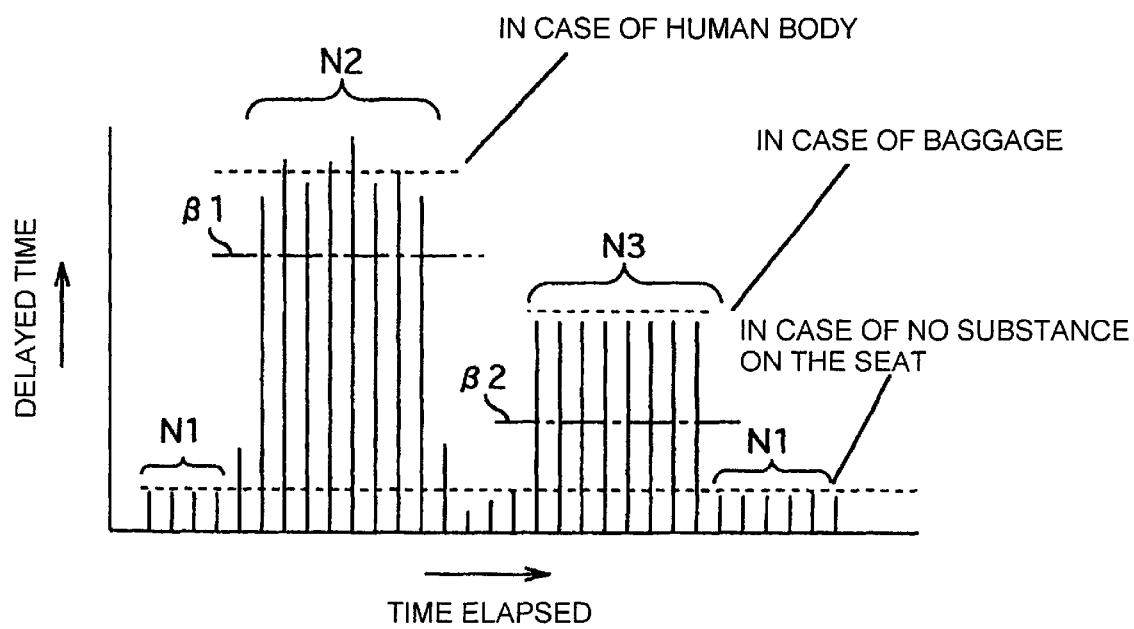
FIG. 7 is a graph illustrating how the output voltage of the photo-transistor is delayed in time relative to the input signal of the illumination diode.

The graph in FIG. 7 illustrates the relationship between the passage of time (horizontal axis) and the delayed time (vertical axis). If neither a person nor baggage is located on the seat 1, the amount of light passing through the optical fiber 20 is large, and so the time delay becomes smaller as indicated by the region N1 in FIG. 7. However, a person sitting on the seat 1 decreases the amount of light passing through the optical fiber 20, thus increasing the delay time as indicated by region N2 in FIG. 7. Thus, if the time delay is in excess of a threshold value β1 (corresponding to T1+α1), it can be determined that a person is sitting on the seat 1. In addition, if a bag is located on the seat 1, the resulting load is once again applied to the optical fiber 20. This also results in a time delay increase which is indicated as region N3 in FIG. 7.

If the delay time is not greater than the threshold value β1, but is in excess of the threshold value β2 (β2<time delay<β1; where β1>β2), it is possible to recognize that baggage, which is most typically lighter than a person, is located on the seat 1. In addition, when it is determined that the time delay is not greater than the threshold value β2, it is recognized that neither a person nor baggage having a weight above a predetermined value is located on the seat 1.

The frequency of changing of the magnitude of the time delay can be used for establishing a precise distinction between a person or human body and baggage. More specifically, so long as an abrupt acceleration or deceleration is not made, the frequency of movements of the baggage on the seat 1 is low per unit time. However, a person seated on the seat 1 moves more frequently per unit time than baggage, even when no acceleration or no deceleration occurs or, of course, when an abrupt acceleration or deceleration does occur.

Thus, when the frequency of the magnitude change of the time delay is smaller than a threshold value X, this provides an indication that baggage is located on the seat 1. On the other hand, if the frequency of change of the magnitude of the time delay is larger than the threshold value X, this can be used to determine that a person is sitting on the seat 1.

Figure 8:
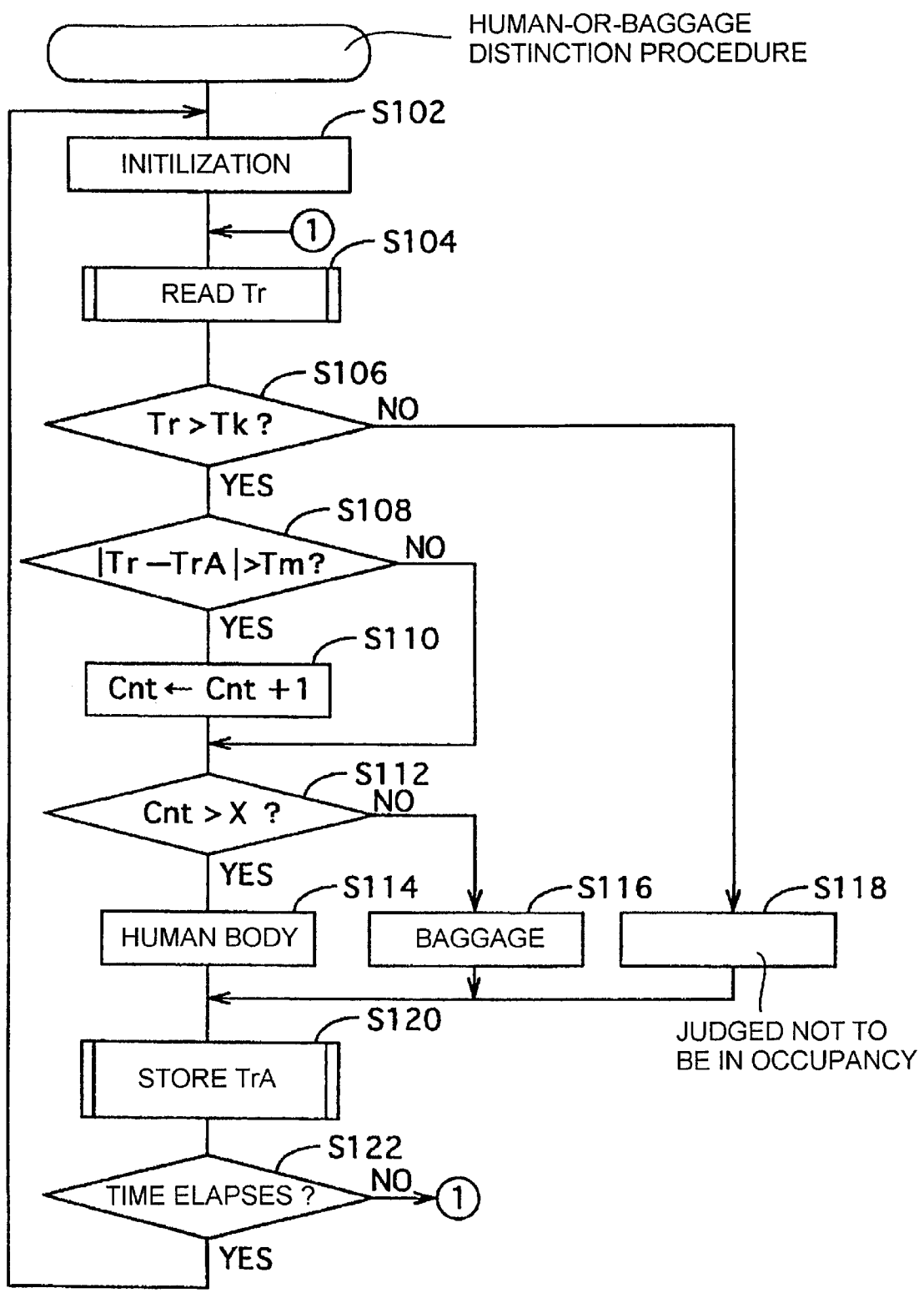
FIG. 8 is a flowchart illustrating the program performed in the human/baggage distinction procedure.

FIG. 8 illustrates a flowchart showing a program routine of the human/baggage distinction procedure which is executed by the micro-computer associated with the control processing circuit 55. In this flowchart, Tr means a measured delay time (the difference between the light emitting signal and the light receiving signal), TrA refers to an averaged measured delay time, and Cnt means a measured frequency. At step S102, initialization is performed to clear resisters for receiving the respective values Tr, TrA, and Cnt.

At step S104, the measured delay time Tr is read and stored into the resister. At step S106, the delay time Tr is compared to a threshold value Tk (e.g., β2 or zero can be employed.). If the result indicates that the delay time Tr is not greater than the threshold value Tk, the program routine proceeds to step S118 to indicate that neither a person nor baggage is located on the seat. Thus, steps S106 and S118 act as a judging means for judging that neither a person nor baggage is positioned on the seat 1.

If the result in step S106 indicates that the delay time Tr is greater than the threshold value Tk, step S108 is executed to make a comparison of the threshold value Tm (which can be made to be zero) with the absolute value of (Tr−Tra) or the absolute value of the difference between Tr and Tra. If the absolute value of (Tr−Tra) is greater than the threshold value Tm, step S110 is executed to increase the content of the counter Cnt by 1. Thus, steps S108 and S110 acts as a movement frequency measuring means for measuring the frequency of changing of the delay time. If the absolute value of (Tr−Tra) is not greater than the threshold value Tm, the program routine proceeds to step S112.

At step S112, the value or content of the counter Cnt is compared to a frequency threshold value X. If the value or content of the counter Cnt is not greater than the frequency threshold value X, thus indicating that the frequency of the change of the delay time is low, step S116 is executed to issue a signal indicating that a baggage, with which is typically associated a low movement frequency, is located on the seat 1.

If the value or content of the counter Cnt is larger than the frequency threshold value X, thus indicating that the frequency of the change in the delay time is high, step S114 is executed to issue a signal indicating that a person, with which is typically associated a high movement frequency, is seated on the seat 1. Thus, steps S112, S114, and S116 function as a human/baggage distinction means for determining whether a person or baggage is positioned on the seat 1.

After steps S114, S116, S118, step S120 is carried out during which a sub-routine is executed to calculate the averaged measured delay time Tra and the resulting value is stored in its own resister or storage region. Next, at step S122, the system determines whether or not a particular time has elapsed. If the result in step S122 is negative, the program routine returns to step S104 for continuing the calculation of the frequency of movement. If the result in step S122 is positive, the program routine proceeds to S102 to clear the foregoing variables. If such a clear operation is not performed, the frequency of movements will continue to be counted for a long time, which will result in the frequency of movements counted being quite large, thus making it difficult to detect a small frequency of movements.

It is to be understood that the detection mode associated with the present invention is not limited to the procedure following the illustrated flowchart described above and shown in FIG. 8. Rather, the illustrated and described embodiment is an example of one way of effecting the described detection, with another detection procedure using another flowchart being possible.

Figure 9:
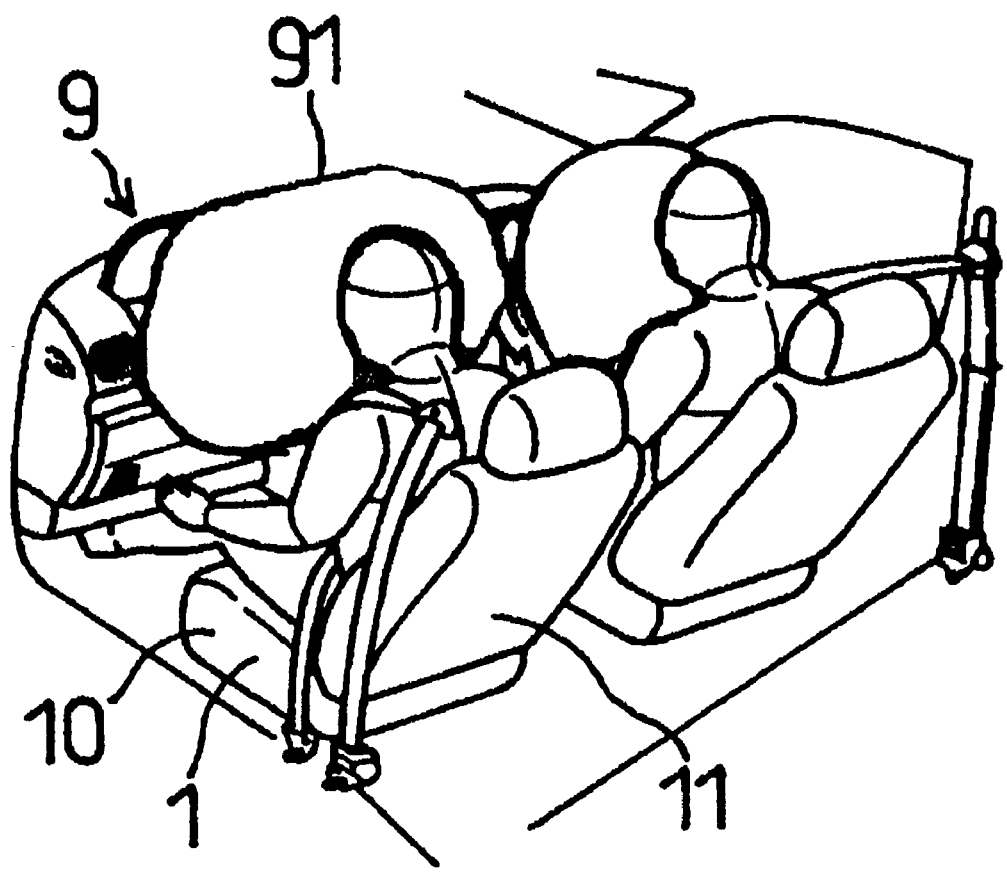
FIG. 9 is a perspective illustrating the use of the present invention in the context of an airbag actuation device.
Figure 10:
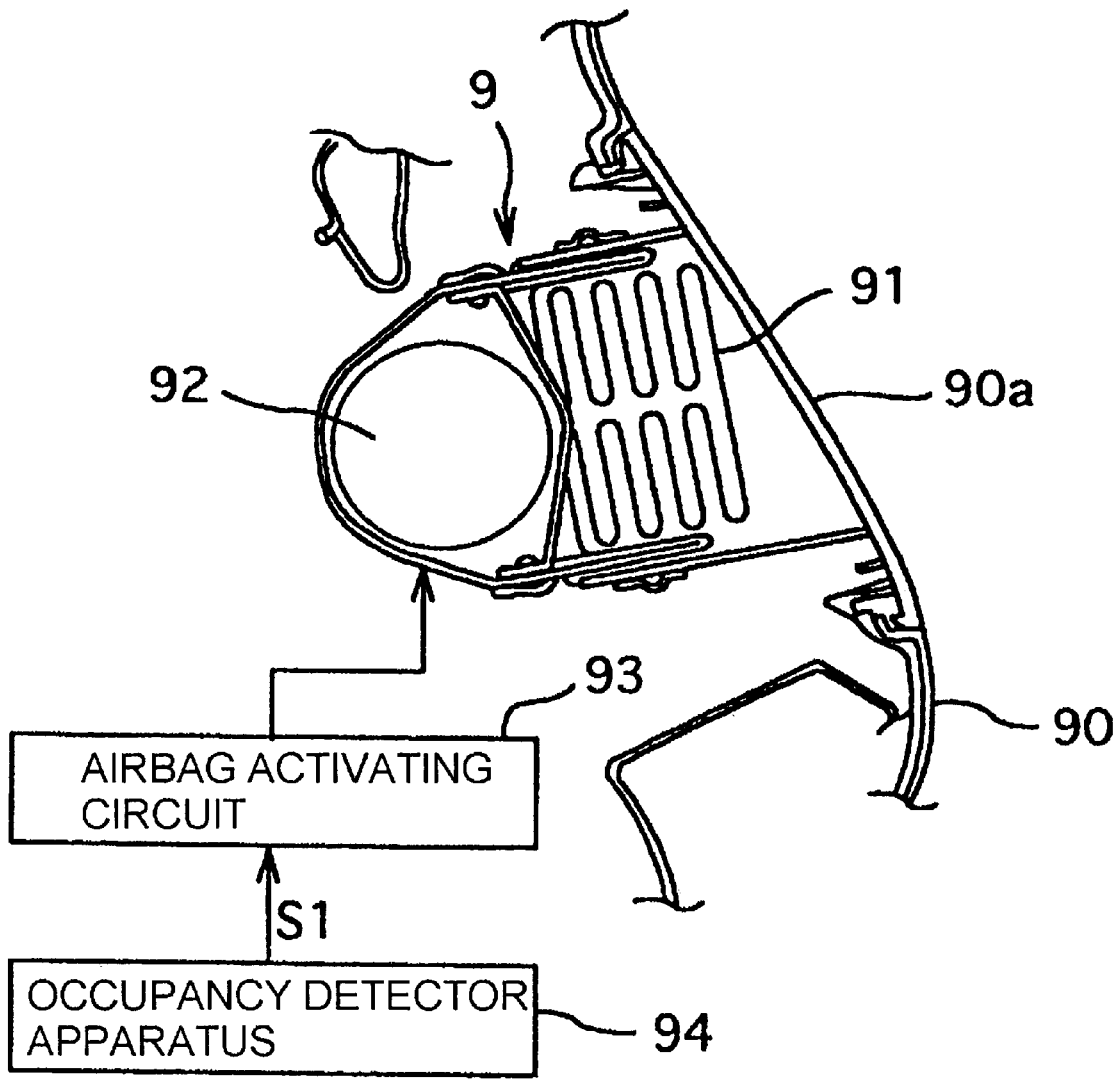
FIG. 10 is a partial cross-sectional view of the device shown in FIG. 9.

An occupancy detector sensor or apparatus according to a third embodiment of the present invention is illustrated in FIGS. 9 and 10 and is designed to distinguish between the presence, if any, of a person or baggage on a seat in a manner similar to that described above. The apparatus according to this third embodiment is identical with the apparatus of the second embodiment in concept, structure and operation, except that the third embodiment is applied to an airbag system 9 for a front passenger's seat.

The airbag system 9 includes an airbag 91 which is inflatable and which is folded in the inside of a lid 90*a* of a console 90 or dashboard, an inflator or inflation device 92 for inflating the airbag 91 within a very short period of time (e.g., by supplying an inflating agent and gas into the airbag 91), an airbag activating circuit 93 having an ignition mechanism for activating the inflation device 92, and the occupancy detector apparatus or seat detection apparatus 94 which is identical to the occupancy detector apparatus or seat detection apparatus of the second embodiment described above and which issues a signal S1 indicating whether a human or baggage is positioned on the front passenger's seat 1. The occupancy detector apparatus 94 functions to distinguish whether or not a human or baggage, if any, is located on the front passenger seat 1.

Thus, when a person sits on the passenger's seat 1, the signal indicating such a condition is fed from the occupancy detector apparatus 94 to the airbag activating circuit 93. Similarly, when a baggage is located on the passenger's seat 1, the signal indicating such a condition is fed from the occupancy detector apparatus 94 to the airbag activating circuit 93.

Thus, in the case of a vehicle collision, if a person is sitting on the front passenger seat 1, based on the signal from the occupancy detector apparatus 94, the air bag activating circuit 93 begins to operate the inflation device 92 to inflate the air bag 91. On the other hand, if a baggage is on the front passenger seat 1 or the front passenger seat 1 is not occupied, based on the corresponding signal from the occupancy detector apparatus 94, the air bag activating circuit 93 does not operate to inflate the inflation device 92.

It is also to be noted that this occupancy detector apparatus 94 can be applied to other seats in the vehicle such as the driver's seat and the rear seat.

Figure 11:
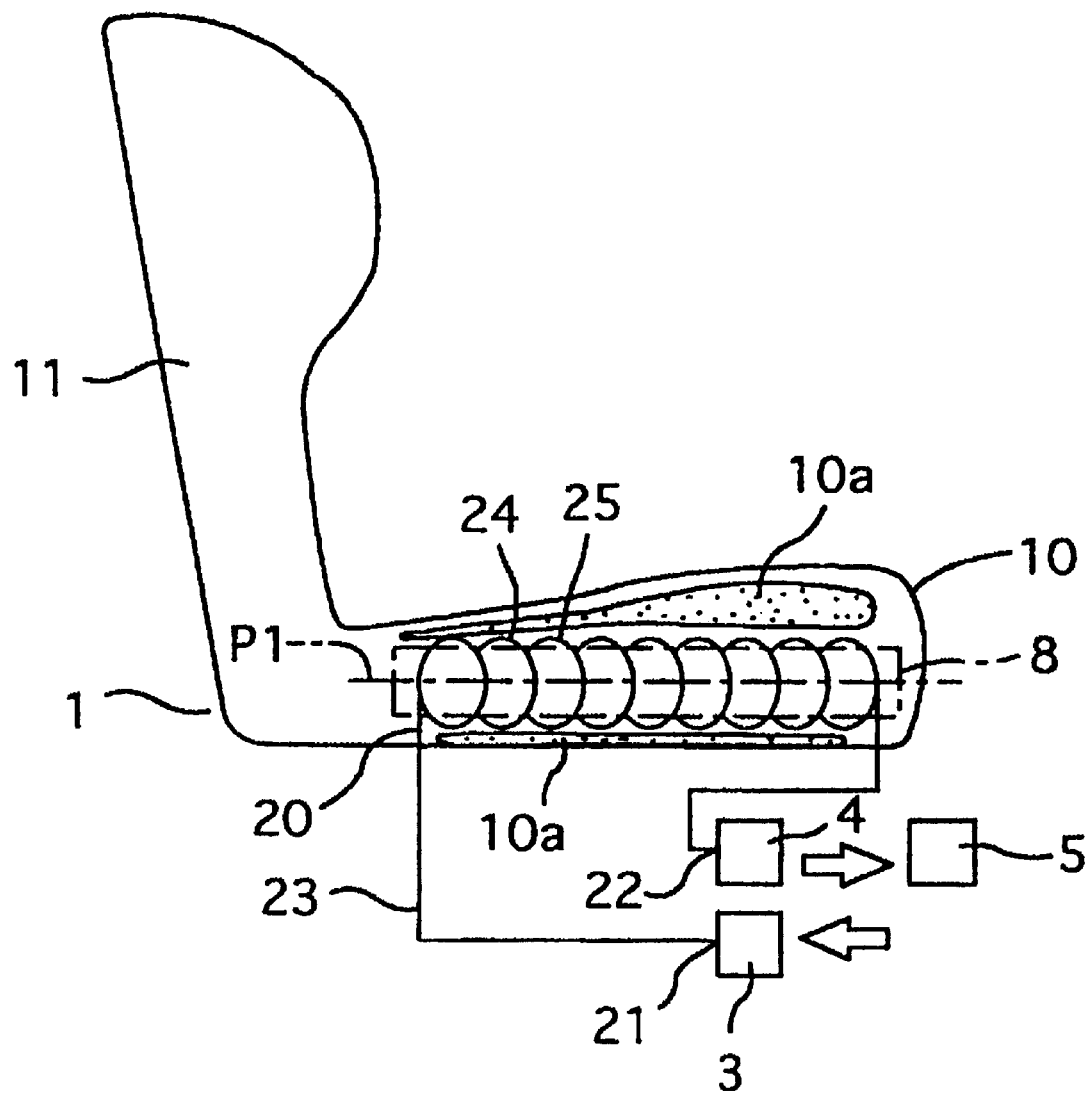
FIG. 11 is a side view of a vehicle seat illustrating a seat occupant sensor in accordance with another embodiment of the present invention.
Figure 12:
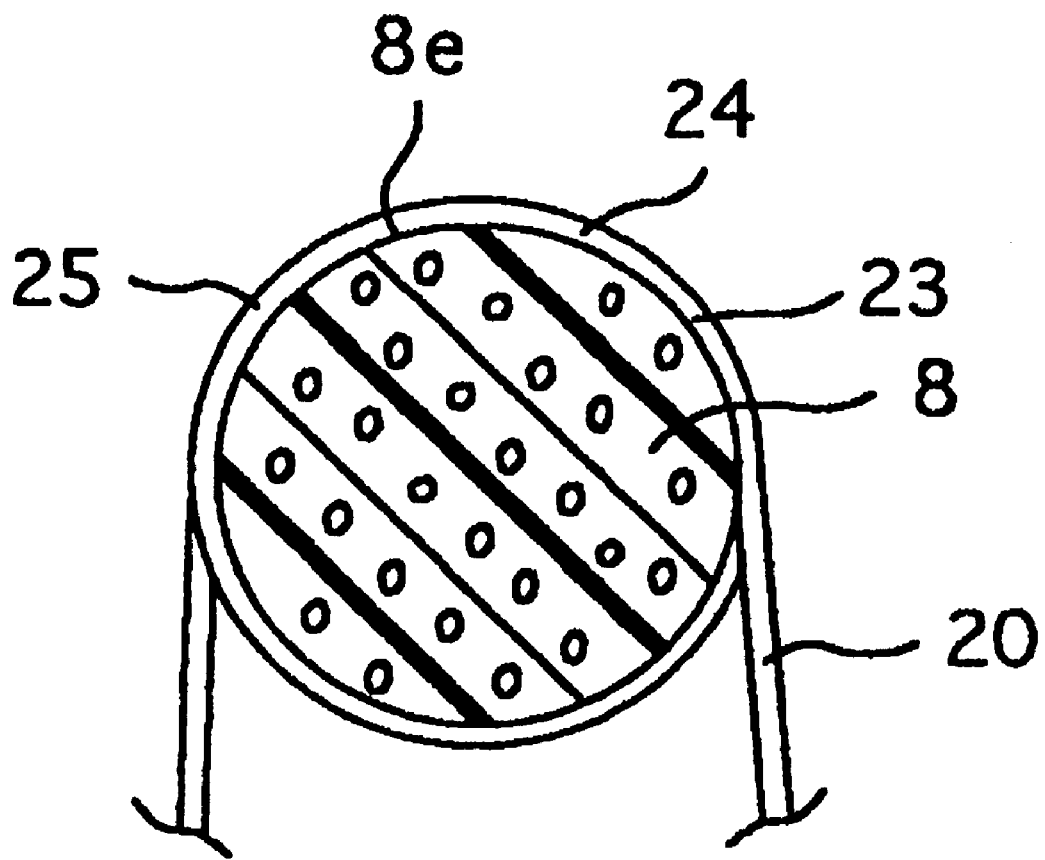
FIG. 12 is a cross-sectional view of the core around which the optical fiber shown in FIG. 11 is wound.

A fourth embodiment of the occupancy detector apparatus according to the present invention is illustrated in FIGS. 11 and 12 and explained below. This embodiment is identical to the apparatus of each of the first and second embodiments in concept, structure and operation, except for the detailed structure of the optical fiber. In the apparatus according to the fourth embodiment, the optical fiber 20 has an input end 21 to which light is inputted, an output end 22 from which light is outputted, and a transmissive portion 23 connecting the input end 21 and the output end 22. The transmissive portion 23 of the optical fiber 20 has a loop group 25 comprised of a plurality of loops 24.

Within the loop group 25 is co-axially provided a round bar-shaped or shaft-shaped core 8. The core 8 possesses a circular cross-sectional shape. The core 8 is formed of an elastic material including porous material, e.g., porous resin or porous rubber, so that the core can be returned to its original shape easily after being compressed. The core 8 and the loop group 25 are accommodated in the seat cushion 10 of the seat 1 and are adapted to receive a load from the seat cushion 10 when a person sits on the seat cushion 10 of the seat 1.

The transmissive portion of the optical fiber 23 is wound around the outer surface 8*e* of the core 8 in a coil-like fashion as shown in FIG. 12 thus forming the plural loops 24 of the loop group 25. As mentioned above, winding the optical fiber 20 around the core 8 formed of elastic material makes it possible to constitute the loop group 25 in the optical fiber 20. In addition, changing outer dimension or diameter of the core 8 can change the diameter of each of the loops 24 of the loop group 25 of the optical fiber 25 to any size or as desired. Moreover, even when the load associated with a person or baggage being located on the seat cushion 10 of the seat 1 is applied to the loop group 25 of the optical fiber 20, it is possible to prevent excess application of the load to the loop group 25 of the optical fiber 20, thereby ensuring the protection of the loop group 25 of the optical fiber 20. Further, once the core 8 is compressed due to application of the load from the person (or baggage) on the seat cushion 10 of the seat 1, the core 8 can relatively easily and immediately return to its original shape when the person (or baggage) leaves the seat cushion 10 of the seat 1. Thus, the core 8 acts as a restoring means for bringing the reduced curvature radius of the loop 24 of the optical fiber 20 back to its original curvature radius. It is to be noted that the cross-sectional shape of the core 8 is not limited to the illustrated round shape and can be formed into other shapes.

In the foregoing embodiments, the rounded loop 24 is employed as the bent portion of the optical fiber 24. However, the invention is not limited in this respect. For example, the bent portion can have a V-shaped structure with a somewhat rounded apex in which the input end is at one end of the V-shaped structure while the outlet end is at the other end of the V-shaped structure. The bent portion can also be in the form of an inverted V-shaped structure with a somewhat rounded apex in which the input end is at one end of the inverted V-shaped structure and the outlet end is at the other end of the inverted V-shaped structure. It is also possible to employ a structure involving an alternating and repeating series of V-shaped and inverted V-shaped elements each having somewhat rounded vertices in which the input end is at one end of the alternating series and the output end is at the opposite end of the alternating series.

In addition, it is also envisioned that the bent portion can have a U-shaped structure with the input end is at one end of the U-shaped structure and the outlet end is at the other end of the U-shaped structure, and an inverted U-shaped structure with the input end is at one end of the inverted U-shaped structure and the outlet end at the other end of the inverted U-shaped structure. Another possible structure involves an alternating and repeating series of U-shaped elements and inverted U-shaped elements in which the input end is at one end of the alternating series and the output end is at the opposite end of the alternating series.

In addition, it is also possible to employ an optical fiber 20 in a straight condition in the seat cushion 10 of the seat 1 which makes it possible to deform the optical fiber 20 such that the curvature radius of the optical fiber becomes smaller when applied with the load from a person (or baggage) on the seat 1. In addition, depending upon the circumstances, the optical fiber 20 can be provided only in the seat back 11 of the seat 1 or can be provided in both the seat cushion 10 and the seat back 11.

The detecting device according to the second embodiment operates by utilizing the delayed time of the output voltage (light receiving signal) as the difference between the input voltage of the LED as the light emitting means and the output voltage of the photo-transistor 40 (light receiving signal) as the light receiving means. However, the invention is not limited in this regard. For example, as the difference, the voltage difference between the input voltage and the output voltage at the same time or the pulse width difference can be used.

Also, the light emitting means and the light receiving means can take forms other than those described above and illustrated in the drawing figures.

It is thus seen from the foregoing detailed description and the accompanying drawing figures that the seat occupancy sensor of the present invention possesses a variety of different characteristics. For example, the detecting device is provided with a movement frequent measuring mechanism that counts the frequency of movements of the person or baggage on the seat per unit time. The detecting device also has an absence judging mechanism which determines whether or not a person or baggage is located on the seat. The optical fiber is constructed as a loop group in the form of a coil and is arranged so that the axis of the coil extends parallel to the seat cushion of the seat, although the optical fiber can also be constructed as a loop group in the form of a coil having an axis extending perpendicular to the direction of load from the person (or baggage) on the seat cushion of the seat. The optical fiber can alternatively be constructed as a loop group in the form of a coil extending around a core formed of an elastic material.

The seat occupancy sensor of the present invention also provides a variety of advantages. For example, the elastic member prevents excess deformation of the loop group of the optical fiber when a person sits on the seat. In addition, when the person leaves the seat, the restoration force ensures the return movement of the loop group of the optical fiber to its initial shape. The curvature radius of the bent portion of the optical wave guide is variable depending on the weight of the person or baggage on the seat. Also, the curvature radius of the bent portion can return to its original state when the seat becomes unoccupied by virtue of the elastic member provided in the bent portion.

It is also to be understood that the present invention is applicable to other fields and applications. For example, a pressure sensor, a stress sensor, and/or a load sensor can be constructed to include an optical wave guide provided in a seat to allow light to pass therethrough, with the optical wave guide having a portion which is transmissive to a light and possessing a variable curvature radius, and with the optical wave guide changing the physical quantity of light passing through the light transmissive portion when the curvature varies as a result of the presence of an occupant on the seat. Such sensors can also be provided with light emitting means for inputting light into the optical wave guide, a light receiving means for receiving light outputted from the optical wave guide, and a detecting device which detects the presence of an occupant on the seat.

As described above, an on-seat occupant detector apparatus can be mounted in an automotive vehicle and associated with an airbag system. Applying the on-seat occupant detector apparatus to an airbag system, a new concept airbag system can be established which comprises an airbag which is to be inflated upon receipt of an amount of gas, an inflator for inflating the air bag by supplying gas into the airbag, an airbag actuating circuit which operates the inflator to supply the gas into the airbag, and judging means for determining whether a person or baggage, if either, is located on the seat. Based on a signal from the judging means, the airbag actuating circuit initiates or begins operation of the inflator for inflating the airbag upon the occurrence of an emergency such as vehicle collision while the person is seated on the seat. On the other hand, based on another signal from the judging means indicating the presence of baggage on the seat or indicating the absence of a person as well as baggage on the seat, the airbag actuating circuit is not operated, even upon the occurrence of an emergency condition.

In accordance with the present invention, if a person is seated on the seat cushion of the seat, a load is applied to the optical wave guide, thus changing the curvature of the optical wave guide so that the amount of physical quantity of light passing through the transmissive portion of the optical fiber also changes. Such a change in the physical quantity is recognized as a changes in the light received by the light receiving means. On the basis of this, the detecting device determines whether or not a person (or baggage) is located on the seat.

Employing an optical wave guide which is in the form of an optical fiber having at least one bent portion and which operates in such a manner that the amount of light passing through the transmissive portion of the optical fiber changes if the bent portion is deformed due to the presence of a person (or baggage) on the seat, the curvature of the transmissive portion is relatively easy to bend upon application of the load from a person (or baggage) located on the seat. This makes the change in the amount of light passing through the transmissive portion relatively easy as well.

In addition, with the detecting device able to detect an occupant (or baggage) on the seat by utilizing the difference between the light receiving signal and the light emitting signal, such detection can be made relatively easily. Also, because the detecting device is able to distinguish between a person sitting on the seat and other occupancy on the seat such as baggage, the device is well suited for use with an airbag system.

Because the optical fiber is formed of a plastic material, even when the bending stress resulting from the applied load associated with a person being seated in the seat is applied to the optical fiber, it is possible to restrict or prevent possible damage to the optical fiber.

When the seat is a vehicular seat, it is possible to judge whether or not a person is seated on the seat and so it is possible to establish how may passengers are in the vehicle. In addition, the present invention can be applied to a warning device which issues a warning when there is a person seated on the seat who has not fastened the seat-belt.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A seat occupancy sensor comprising:
   an optical wave guide provided in a seat, the optical wave guide including a loop portion transmissive to light and possessing a curvature radius that is variable, the optical wave guide being adapted to change a physical quantity of light passing through the light transmissive loop portion when the curvature radius of the light transmissive loop portion varies as a result of a load applied by occupancy of the seat;
   light emitting means connected to the optical wave guide for inputting light into the optical wave guide;
   light receiving means connected to the optical wave guide for receiving light outputted from the optical wave guide; and
   a detecting device which detects occupancy of the seat based on a change in the physical quantity of light passing through the light transmissive loop portion of the optical wave guide due to a change in the curvature radius of the light transmissive loop portion.

2. The seat occupancy sensor as set forth in claim 1, wherein the optical fiber is formed of plastic.

3. The seat occupancy sensor as set forth in claim 2, wherein the detecting device detects occupancy of the seat based on a difference between an emitted light signal of the light emitting means and a light receiving signal of the light receiving means.

4. The seat occupancy sensor as set forth in claim 1, wherein the detecting device detects occupancy of the seat based on a difference between an emitted light signal of the light emitting means and a light receiving signal of the light receiving means.

5. The seat occupancy sensor as set forth in claim 4, wherein the difference is an amount of time delay of the light received by the light receiving means relative to the light emitted by the light emitting by the light emitting means.

6. The seat occupancy sensor as set forth in claim 1, wherein the detecting device is adapted to distinguish whether the seat is occupied by a person or an item other than a person based on a difference in an amount of time delay of the light received by the light receiving means relative to the light emitted by the light emitting means.

7. The seat occupancy sensor as set forth in claim 6; including a voltage input device which inputs a voltage signal defined by a rising leading edge and falling trailing edge to the light emitting means in pulses, with the light emitting means emitting the light in pulses during occupancy of the seat.

8. The seat occupancy sensor as set forth in claim 1, wherein the seat is a vehicle seat mounted in a vehicle.

9. An occupancy detectable seat comprising:
   a seat portion with respect to which a person is to be seated;
   a light emitter adapted to emit light;
   an optical wave guide provided in the seat portion and including an input portion connected to the light emitter to receive light emitted by the light emitter and an output portion, the optical wave guide being in the form of an optical fiber having a loop portion possessing a curvature radius that changes due to application of a load to the optical fiber associated with occupancy of the seat portion to change a physical quantity of light passing through the optical wave guide;
   a light receiver connected to the output portion of the optical wave guide for receiving light outputted from the optical wave guide; and
   a detecting device detecting occupancy of the seat portion based on the change in the physical quantity of light passing through the optical wave guide due to application of the load to the optical wave guide associated with occupancy of the seat portion.

10. The occupancy detectable seat as set forth in claim 9, wherein the detecting device detects occupancy of the seat portion based on a difference between an emitted light signal of the light emitter and a light receiving signal of the light receiver.

11. The occupancy detectable seat as set forth in claim 10, wherein the difference is an amount of time delay of the light received by the light receiver relative to the light emitted by the light emitter.

12. The occupancy detectable seat as set forth in claim 10, including means for measuring a frequency of changing of the time delay.

13. The occupancy detectable seat as set forth in claim 11, including means for determining that the seat portion is occupied by a person when the frequency of changing of the time delay is greater than a predetermined value.

14. The occupancy detectable seat as set forth in claim 9, wherein the detecting device is adapted to distinguish whether the seat is occupied by a person or an object other than a person based on a difference in an amount of time delay of the light received by the light receiver relative to the light emitted by the light emitter.

15. The occupancy detectable seat as set forth in claim 14, including a voltage input device which inputs a voltage signal defined by a rising leading edge and falling trailing edge to the light emitter in pulses.

16. The occupancy detectable seat as set forth in claim 9, wherein the seat portion is a seat cushion of a vehicle seat.

17. A seat occupancy sensor for determining occupancy of a seat, comprising:
   a light emitter adapted to emit light;
   an optical wave guide adapted to be positioned in the seat and including an input portion connected to the light emitter to receive light emitted by the light emitter and an output portion, the optical wave guide including an optical fiber having a loop portion possessing a curvature radius that changes due to application of a load to the optical fiber associated with occupancy of the seat to change a physical quantity of light passing through the optical wave guide;

a light receiver connected to the output portion of the optical wave guide for receiving light outputted from the optical wave guide; and a detecting device detecting occupancy of the seat based on the change in the physical quantity of light passing through the optical wave guide due to application of the load to the optical wave guide associated with occupancy of the seat.

18. The seat occupancy sensor as set forth in claim 17, wherein the detecting device is adapted to distinguish whether the seat is occupied by a person or an item other than a person based on a difference in an amount of time delay of the light received by the light receiver relative to the light emitted by the light emitter.

* * * * *